No. 860,380. PATENTED JULY 16, 1907.
A. H. HOGEN.
SELF DUMPING HAY RAKE.
APPLICATION FILED JAN. 25, 1907.

WITNESSES

INVENTOR
Abel H. Hogen
BY
ATTORNEYS

UNITED STATES PATENT OFFICE.

ABEL H. HOGEN, OF GEDDES, SOUTH DAKOTA.

SELF-DUMPING HAY-RAKE.

No. 860,380. Specification of Letters Patent. Patented July 16, 1907.

Application filed January 25, 1907. Serial No. 354,023.

*To all whom it may concern:*

Be it known that I, ABEL H. HOGEN, a citizen of the United States, and a resident of Geddes, in the county of Charles Mix and State of South Dakota, have invented a new and Improved Self-Dumping Hay-Rake, of which the following is a full, clear, and exact description.

This invention has reference to improvements in self-dumping hay rakes, and is designed to automatically dump the rake as soon as loaded, without interference on the part of the operator; also to automatically dump the hay each time at the same point on the field, thus establishing continuous rows of hay, commonly known as windrows.

Reference is to be had to the accompanying drawings forming a part of this specification, in which similar characters of reference indicate corresponding parts in all the figures.

Figure 1:
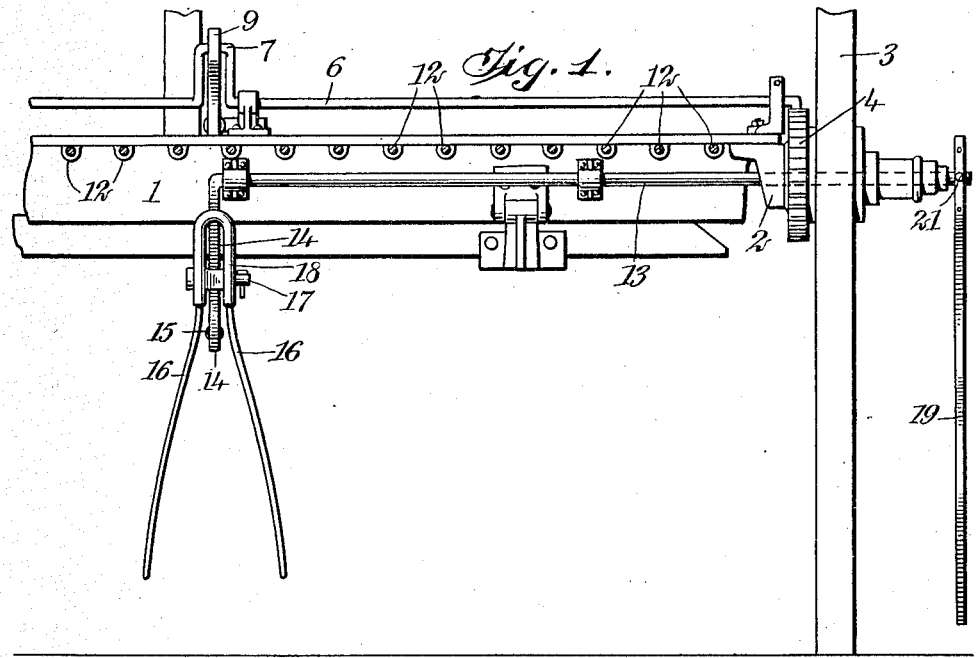
Figure 2:
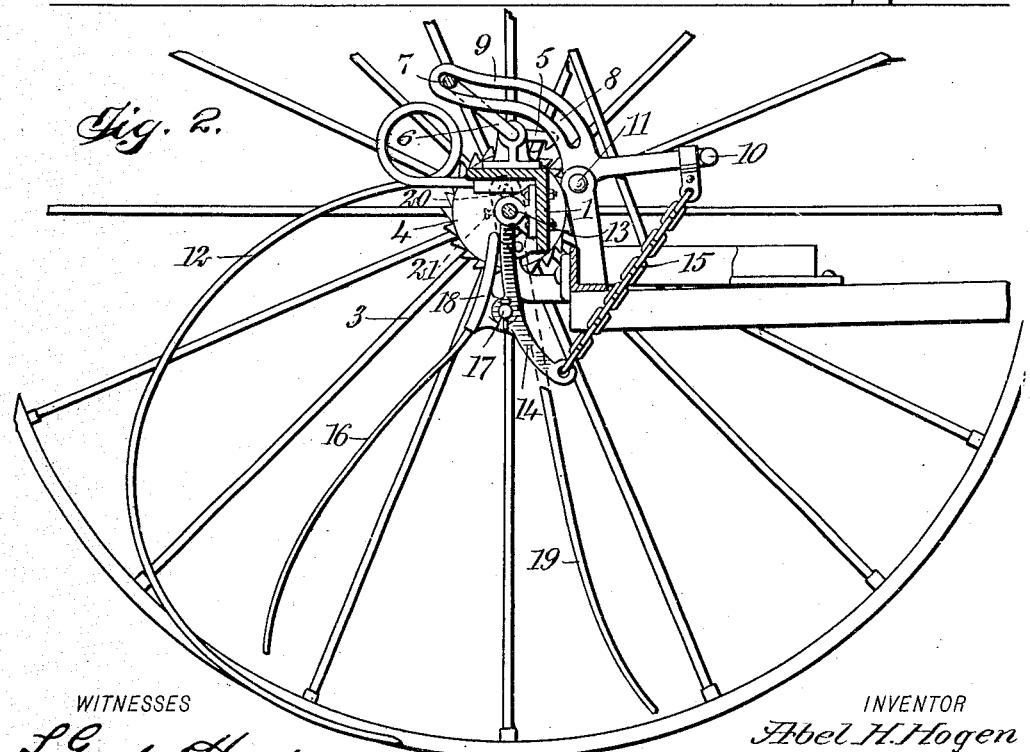

Figure 1 is a fragmentary, rear, end elevation of an ordinary form of hay rake with my improvements applied thereto, and Fig. 2 is a cross section of the construction shown in Fig. 1.

Referring to the drawing, 1 indicates a cross beam having secured at each end thereof a bracket 2 from which projects an axle on which a wheel 3 is journaled. Between the brackets 2 and the wheels, and in fixed relation with the latter, are ratchet wheels 4 adapted to be engaged by pawls 5 during the dumping operation of the rake. The pawls 5 are rigidly fixed to a rod 6, which is journaled on the beam 1 and has a crank 7 at an intermediate portion of its length. The crank 7 passes through the reversely-curved slot 8 of an arm 9, the latter being made as an integral part of a foot lever 10, which is arranged at the front of the machine and pivoted at 11 to a suitable support.

At the rear of the machine, tines 12 are fixed to the beam 1 and curve forwardly, as illustrated in Fig. 2. This part of the construction so far described, forms no part of my invention, but is simply to show its application to the ordinary form of dumping hay rake.

At one side of the beam 1, preferably the rear side, is journaled in suitable bearings a shaft 13, said shaft having a downwardly-extending arm 14 near the center of the machine, which is preferably slightly curved as shown in Fig. 2, and connected with the foot lever 10 by a chain 15 or other flexible device. At about midway the length of the arm 14 a fork 16 is detachably pivoted thereto by a bolt or pin 17. The tines of the fork 16, as shown in Fig. 2, are attached at their upper ends to a U-shaped member 18, which, when the rake is in operation, presses upon the arm 14 and limits the rearward movement of the fork with respect thereto.

The rod 13 at the right of the machine passes centrally through the axle of the wheel 3 and is extended slightly beyond said axle, as shown in Fig. 1. The rod 13 is freely revoluble within said axle and has fixed to its outer end an adjustable arm 19, said arm being slightly curved forwardly as shown in Fig. 2. The adjustable connection between the rod 13 and the upper end of the arm 19 is preferably made by providing said arm with a number of openings 20, shown in dotted outline in Fig. 2. These openings snugly fit the rod, which is held in any one of them by a set screw 21, this construction providing for the adjustment of the arm above the ground, as also its relative forward and rearward position.

The use of my improved machine is as follows: On driving the machine over the field after the hay has been mown, it is collected by the tines 12 but is prevented from passing at the center of the machine to the rear of the tines, by the fork 16. The pressure of the collected hay thus brought to bear on the fork 16 soon becomes sufficient to pull down the foot lever 10, through the intermediate mechanism, and as a consequence engage the pawls 5 with the ratchet wheels 4. The further movement of the machine wheels, after the pawls are engaged with said ratchet wheels, tilts the beam 1 and lifts the tines 12 from the ground, thereby dumping the load of hay.

After the machine has once passed over the field and established a series of piles of hay, the fork 16 is detached from the arm 14 by withdrawing the pin 17. The machine or rake, on now traversing the field, will gather the hay in the tines 12 until the first dumping point is reached. When this point is reached the arm 19 strikes the load of hay previously dumped and is drawn rearwardly, causing the foot lever 10 to be again depressed and the hay in the tines 12 deposited in alinement with the hay which operates the arm 19. This operation of the rake is continued as the rake passes over the field, forming successive rows of hay commonly known as windrows.

It is obvious that my improvements will not interfere with the ordinary working of the rake, as the foot lever 10 may be depressed when desired by the driver, when my improvements are in position.

Having thus described my invention I claim as new and desire to secure by Letters Patent:

1. In combination with a hay rake having a lever and connections operable to dump the rake, a fork attached to said lever acting under the pressure of the load, to operate said lever when the rake is loaded.

2. In combination with a hay rake having a foot lever and connections operable to dump the rake, a fork pivotally supported from the rake, and a flexible connection between the fork and lever.

3. In combination with a hay rake having tines, operated by a foot lever and connections operable to dump the rake, a fork pivotally suspended from the rake between said tines, and means connecting the fork with the lever acting to operate it to dump the load when the rake is loaded.

4. In combination with a hay rake having a foot lever and connections operable to dump the rake, an arm and intermediate connections between said arm and the foot lever and adapted to automatically operate said lever by means of an obstruction in the path thereof.

5. In combination with a hay rake having a foot lever and connections operable to dump the rake, an arm arranged beyond the end of the rake, and intermediate connections between said arm and lever, said arm being adapted to automatically operate said lever when the arm encounters an obstruction in the path thereof.

6. In combination with a hay rake, means for automatically dumping the rake controlled by the pressure of the collected hay, and means for automatically dumping the rake operable by an obstruction in the path thereof.

7. In combination with a hay rake having a foot lever and connections operable to dump the rake, a fork and connections for automatically operating the foot lever and controlled by the pressure of the collected hay, an arm arranged beyond the end of the rake, and intermediate connections between said arm and lever acting to automatically operate the lever when the arm encounters an obstruction in the path of the arm.

8. The combination of a cross beam having tines fixed thereto, axles carrying wheels fixed at the opposite ends of the cross beam, a foot lever and connections operable to tilt the cross beam and raise the tines, a shaft journaled on the cross beam and passing through one of said axles, an arm fixed to the outer end of the shaft, an arm fixed to the opposite end of the shaft, and means connecting said last-named arm with the foot lever.

9. The combination of a cross beam having tines fixed thereto, axles carrying wheels fixed at the opposite ends of the cross beam, a foot lever and connections operable to tilt the cross arm and raise the tines, a shaft journaled on the cross beam having an arm, means connecting said arm with the foot lever, and a fork carried by said arm.

10. The combination of a cross beam having axles carrying wheels fixed at the opposite ends thereof, tines fixed to the cross beam, a lever and connections operable to raise the tines, a shaft journaled on the cross beam and passing through one of said axles, an arm adjustably fixed to the outer end of said shaft, a second arm fixed to said shaft, and a flexible connection between said foot lever and said second arm.

11. The combination of a cross beam having axles carrying wheels fixed at the opposite end thereof, tines fixed to said cross beam, a foot lever and connections operable to tilt the cross beam and raise the tines, a shaft journaled on the cross beam and passing through one of said axles, an arm adjustably and removably attached to the outer end of said shaft, a second arm fixed to said shaft, means connecting said second arm with the foot lever, and a fork detachably and pivotally connected to said second arm.

In testimony whereof I have signed my name to this specification in the presence of two subscribing witnesses.

ABEL H. HOGEN.

Witnesses:
T. F. WARD,
SIVERT WALSTAD.